United States Patent
Yamaura et al.

(10) Patent No.: US 6,590,584 B1
(45) Date of Patent: Jul. 8, 2003

(54) IMAGE EDITING METHOD AND APPARATUS

(75) Inventors: Fukumi Yamaura, Kawasaki (JP); Rui Yamagami, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/520,718

(22) Filed: Mar. 8, 2000

(30) Foreign Application Priority Data

May 17, 1999  (JP) ............................................ 11-135522

(51) Int. Cl.⁷ ................................................ G09G 5/00
(52) U.S. Cl. ....................... 345/704; 345/745; 345/764; 345/811
(58) Field of Search ................................ 345/745, 704, 345/811, 812, 813, 816, 817, 823, 720–722

(56) References Cited

U.S. PATENT DOCUMENTS

| | | | | |
|---|---|---|---|---|
| 4,862,498 A | * | 8/1989 | Reed ...................... 379/355.09 |
| 5,121,448 A | * | 6/1992 | Katayama et al. .......... 382/284 |
| 5,844,542 A | * | 12/1998 | Inoue et al. ................ 345/594 |
| 6,046,741 A | * | 4/2000 | Hochmuth ................... 345/704 |
| 6,330,068 B1 | * | 12/2001 | Matsuyama ................ 358/1.14 |
| 6,333,752 B1 | * | 12/2001 | Hasegawa et al. .......... 345/764 |

* cited by examiner

*Primary Examiner*—Kristine Kincaid
*Assistant Examiner*—Nhon D Nguyen
(74) *Attorney, Agent, or Firm*—Oliff & Berridge, PLC (57) ABSTRACT

Image editing method and apparatus which facilitate image editing operation and improve the efficiency thereof by enabling selective use of many editing histories or command strings, used in the past, with ease. A command string used in an editing period for one image is registered as a macro, in correspondence with associated information related to the edited image. When the next image is edited, associated information of registered command strings are displayed, as buttons, in list form. A user can discriminate the contents of the command strings and can visually discriminate a command string appropriate to the currently-edited image by observing the associated information. In response to the user's button selection operation, a corresponding command string is applied to the currently-edited image. Information to easily discriminate the contents of command strings, such as thumbnails of edited images, identification information such as serial numbers allotted to edited images, is used as the associated information.

6 Claims, 10 Drawing Sheets

IMAGE EDITING METHOD AND APPARATUS

BACKGROUND OF THE INVENTION

1. Field of the Invention

The present invention relates to image editing method and apparatus for editing an image including plural figure objects, and more particularly, to image editing and apparatus capable of easily changing editing contents, having image editing functions related to object display position, and image editing functions related to display object processing. The image editing functions related to object display position include generation of figure object including basic figures such as a line, an ellipse and a polygon, generation of graph based on input data base (a circle graph, a line graph, a bar graph, a 3D graph etc.), capture of image object from a scanner, and cutting-out, copying, pasting, movement and deletion of image on an edited document; and image editing functions related to display object processing include coloring, shading, and 3D display.

More specifically, the present invention relates to image editing method and apparatus capable of editing an image with excellent operability in accordance with an instruction input (command) from a user, and more particularly, to image editing method and apparatus for performing editing with simple and efficient operation by utilizing a history of past editing, i.e., a command string.

2. Description of the Related Art

With recent technological innovation, comparatively small and low-price general computer systems such as a personal computer and a work station have been developed, and widely used in various research institutes, enterprise offices, and general consumers' houses.

As one of main purposes of these general computer systems, so-called DTP (Desk Top Publishing) is known. The DTP is important with increasing needs to personally generate documents with high confidentiality, such as intra-company documents and new letters, in a labor saving manner and at a low cost. The DTP is realized by various factors such as the emergence of software allowing a user to freely layout plural documents within one page, the emergence of page printer (e.g., a laser-beam printer) providing printing quality as excellent as typeset quality, implementation of pasting of image captured by an image scanner, a video camera or the like, within a document, and improvement in outline font with high printing quality.

A DTP application to realize DTP operation generally has image editing functions to edit an image including plural figure objects. The image editing functions here include functions related to object display position such as generation of figure object including basic figures such as a line, an ellipse and a polygon, generation of graphs based on input data base (a circle graph, a line graph, a bar graph, a 3D graph etc.), and cutting-out, copying, pasting, movement and deletion of a generated object. Further, the image editing functions include functions related to display object processing such as coloring, shading, and 3D display, or functions for an image read by a scanner such as coloring, cutting-out, pasting/moving/copying, and enlargement/reduction/rotation.

The DTP application provides standard commands often used for these image editing operations in graphical user interface (GUI) format. That is, a user can select a desired command from the pull-down menu of corresponding menu item. Otherwise, often-sued editing commands are represented as buttons and provided in a so-called "tool bar". The user can start a corresponding editing function by the click of a desired button from the tool bar (well-known technique). In a GUI environment, the user can perform almost all the image editing operations merely at the click of a mouse.

Further, the DTP application also includes a preview display function for verification of original image as an edited result by visual observation prior to print output (well-known technique). For example, if "Print Preview" is selected from the pull-down menu of "File" menu included in a menu bar, or a "Print Preview" button is selected from the tool bar, a preview image can be started. The preview image is represented with a reduced display of RGB original image.

It is an ordinary work for DTP users to change somewhat of already-edited image object on a preview image or an edited image having a normal size.

For example, if an attribute value of coloring or the like related to some figure object is to be changed, first, the object is selected on a DTP editing image. Next, a corresponding "Attribute Palette" is selected, and a color attribute or the like is changed to a desired value. Thus the original image can be modified.

Further, generally, command type and command input order used for image editing by the user are provided as patterns, i.e., several "command strings". In other words, a new image file (or an object in the image file) can be changed to a desired image to a certain degree by utilizing the history of past editing, i.e., some of the command strings. Further, the image editing operation can be made efficiently by utilizing such history of past editing.

For example, there is a need to continuously obtain complete images by sequentially reading original images from a scanner and applying similar editing commands to the respective input images. As the editing commands to be applied to the input images, commands for coloring, color adjustment, enlargement/reduction/rotation, cutting-out, pasting into a document file, saving as an image file, and the like, can be given.

However, if the user himself/herself stores plural types of command strings, the load on the user is extremely heavy. For this reason, in use of image editing apparatus such as DTP device, it is desirable to provide some input support for the user's command-string selection with ease.

For example, the image editing apparatus may manage the respective command strings based on identification numbers, otherwise, may display commands included in a command string in list form. However, in the former case where the apparatus displays only the identification numbers, the user cannot grasp the functions of the command strings. Further, in the latter case where the apparatus displays the contents of the command string in list form, the user cannot easily imagine the contents of the editing processing, i.e., an image object generated by application of the command string.

Further, it may be arranged such that names are given to command strings used in the past or add comments to editing contents or the like of the command strings. However, in this case, during image editing, the user must successively input a name and a comment of the command string. This is disadvantageous as a matter of convenience and facilitation. Further, as the name and comments are basically inputted from a keyboard, the characteristic of GUI environment based on intuitive and simple input operation using a mouse is disturbed.

SUMMARY OF THE INVENTION

The present invention has been made in view of the above circumstances and provides excellent image editing method and apparatus capable of editing an image including figure objects and easily changing the editing contents.

Further, the present invention provides excellent image editing method and apparatus capable of editing an image with high operability in accordance with an instruction input (command) from a user.

Further, the present invention provides excellent image editing method and apparatus capable of performing editing operations simply and efficiently by utilizing the history of past editing i.e., a command string.

Further, the present invention provides excellent image editing method and apparatus capable of performing editing operations simply and efficiently by preparing a large number of command strings for selective use with ease.

According to an aspect of the present invention, the image editing method, for editing an image by using plural editing commands, includes: (a) a step of sequentially storing a series of editing commands designated by a user during a period of editing one image; (b) a step of generating associated information related to the image edited based on the series of editing commands; and (c) a step of registering the series of editing commands as a command string, in correspondence with the associated information.

According to another aspect of the present invention, the image editing method, for editing an image by using plural editing commands, includes: (a) a step of sequentially storing a series of editing commands designated by a user during a period of editing one image; (b) a step of generating associated information related to the image edited based on the series of editing commands; (c) a step of registering the series of editing commands as a command string, in correspondence with the associated information; and (d) a step of displaying associated information corresponding to already-registered command strings.

According to another aspect of the present invention, the image editing method, for editing an image by using plural editing commands, includes: (a) a step of sequentially storing a series of editing commands designated by a user during a period of editing one image; (b) a step of generating associated information related to the image edited based on the series of editing commands; (c) a step of registering the series of editing commands as a command string, in correspondence with the associated information; (d) a step of displaying associated information corresponding to already-registered command strings in list form; and (e) a step of, in response to selection of displayed associated information, applying a command string corresponding to the selected associated information to a currently-being edited image.

According to another aspect of the present invention, the image editing method, for editing an image in accordance with a user-input event, includes: (a) a step of storing a series of user-input events, caused during a predetermined image-editing period, as a macro; (b) a step of generating associated information related to editing contents realized by the macro as the user-input events; (c) a step of displaying associated information corresponding to respective macros in list form; and (d) a step of, in response to selection of displayed associated information, applying a macro corresponding to the selected associated information to a currently-edited image.

According to another aspect of the present invention, the image editing apparatus, for editing an image by using plural editing commands, includes: (a) input means for inputting an editing command; (b) edited-image generation means for generating an edited image in accordance with the command inputted via the input means; (c) display means for displaying the edited image on a display screen; (d) input-command storage means for sequentially storing a series of editing commands designated by a user during a period of editing one image; (e) associated-information generation means for generating associated information related to the image edited based on the series of editing commands; and (f) command-string registration means for registering the series of editing commands as a command string, in correspondence with the associated information.

According to another aspect of the present invention, the image editing apparatus, for editing an image by using plural editing commands, includes: (a) input means for inputting an editing command; (b) edited-image generation means for generating an edited image in accordance with the command inputted via the input means; (c) display means for displaying the edited image on a display screen; (d) input-command storage means for sequentially storing a series of editing commands designated by a user during a period of editing one image; (e) associated-information generation means for generating associated information related to the image edited based on the series of editing commands; (f) command-string registration means for registering the series of editing commands as a command string, in correspondence with the associated information; and (g) associated-information display means for displaying the associated information corresponding to already-registered command strings.

According to another aspect of the present invention, the image editing apparatus, for editing an image by using plural editing commands, includes: (a) input means for inputting an editing command; (b) edited-image generation means for generating an edited image in accordance with the command inputted via the input means; (c) display means for displaying the edited image on a display screen; (d) input-command storage means for sequentially storing a series of editing commands designated by a user during a period of editing one image; (e) associated-information generation means for generating associated information related to the image edited based on the series of editing commands; (f) command-string registration means for registering the series of editing commands as a command string, in correspondence with the associated information; (g) associated-information display means for displaying associated information corresponding to already-registered command strings in list form; and (h) command-string application means for, in response to selection of displayed associated information, applying a command string corresponding to the selected associated information to a currently-edited image.

According to another aspect of the present invention, the image editing apparatus, for editing an image in accordance with a user-input event, includes: (a) input means for accepting a user-input event; (b) edited-image generation means for generating an edited image in accordance with the user-input event inputted via the input means; (c) display means for displaying the edited image on a display screen; (d) event storage means for storing a series of user-input events, caused during a predetermined image editing period, as a macro; (e) associated-information generation means for generating associated information related to editing contents realized by the macro as the user-input events; (f) associated-information display means for displaying associated information corresponding to respective macros in list form; and (g) macro application means for, in response to selection of displayed associated information, applying a macro corresponding to the selected associated information to a currently-edited image.

According to the image editing method and apparatus of the present invention, the history of editing commands instruct-inputted from the user is temporarily stored. Further, the history of editing commands used in a period of editing one image, i.e., a command string, is registered in correspondence with associated information related to the edited image. In other words, the series of command strings used in the past is handled as macros.

Further, in the following image editing operation, the associated information related to the already-registered commands are displayed in list form within a window image. The format of list display can be made by, e.g., displaying the respective associated information as buttons and selecting one of command strings at the click of a mouse. The user can discriminate the editing effect of a command string by observing the associated information, and can visually discriminate a command string appropriate to the currently-edited image.

The user can designate desired associated information by the click of a corresponding button within the list display window. In response to this designation operation, a command string corresponding to the associated information is applied to the currently-edited image.

The associated information in the respective aspects of the present invention may be information which allows the user to easily imagine and discriminate the contents of the command strings, e.g., thumbnails of edited images (reduced RGB image data) or identification information such as serial numbers allotted to the edited images.

Further, when the associated information is displayed in list form within the widow image, if additional information such as the date of generation of image, the original size, the printing size, whether form is necessary or unnecessary is added to the associated information, the user's discrimination can be further improved.

That is, according to the present invention, as the command strings used in the past image editing are handled as macros, the operability can be improved. Further, the command strings as the macros are displayed by identification numbers or thumbnails of edited images, the user can easily discriminate editing effects of the respective command strings. Further, upon implementation of the present invention, specific hardware is not required, and further, excessive load is not applied on the user.

Other features and advantages of the present invention will be apparent from the following detailed description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
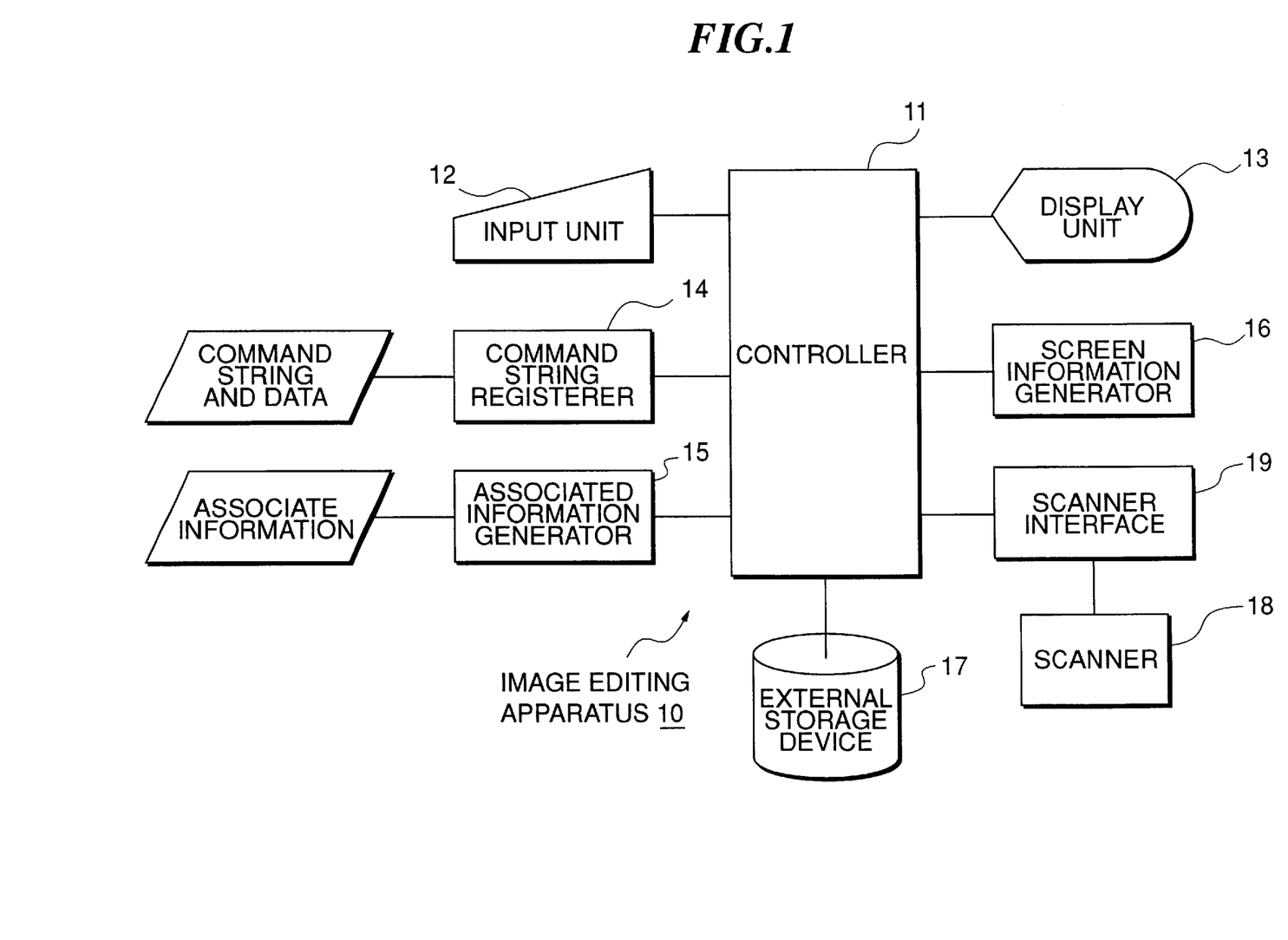
FIG. 1 is a block diagram schematically illustrating the hardware construction of an image editing apparatus 10 appropriate for implementation of the present invention.

FIG. 1 schematically illustrates the construction of an image editing apparatus 10 provided for implementation of the present invention. The image editing apparatus 10 edits an original image having one or more figure objects based on a user's instruction, i.e., an input command. The objects, which are constituent elements of the original image, include basic figures such as a line, an ellipse and a polygon, graphs (a circle graph, a line graph, a bar graph and a 3D graph) based on an input data base, and an image captured by a scanner 18 (to be described later). Further, the commands to edit the objects include commands for generation, cutting-out, copying, pasting, deletion, movement of object, attribute value setting commands for coloring, processing and the like of an object.

As shown in FIG. 1, the image editing apparatus 10 has a controller 11, an input unit 12, a display unit 13, a command string registerer 14, an associated information generator 15, a screen information generator 16, an external storage device 17, the scanner 18 and a scanner interface 19. Hereinbelow, the respective elements will be described.

The controller 11 is a processor which controls the overall operation of the image editing apparatus 10, and specifically, is a CPU (Central Processing Unit) to perform a predetermined image editing application for DTP (Desk Top Publishing) or the like under the control of an operating system (OS). In the present embodiment, the controller 11 is an "event drive type" controller which performs the image editing operation in response to an input event from a user such as editing-command user input.

The input unit 12 is a device which accepts a user-input event such as a command input from the user. A keyboard for character-base command input, a mouse for coordinate-designation type command input and the like are included in the input unit 12. Otherwise, the input unit 12 may be a touch panel provided in a display screen of the display unit 13 to be described later.

The display unit 13 is a device which presents an operation image including an edited image, a menu for command input and the like, to the user. A CRT (Cathode Ray Tube) display and an LCD (Liquid Crystal Display) are included in the display unit 13. On the display screen of the display unit 13, a GUI (Graphical User Interface) environment, for example, is provided. The user can perform intuitive command input based on click operation and drag-and-drop operation on a displayed object by a mouse cursor (not shown).

The command string registerer 14 is a function module which manages a user-input event, i.e., a series of editing commands inputted via the input unit 12, as macros for respective image editing objects. More particularly, the command string registerer 14 sequentially stores a series of editing commands designated from the user during a period of editing one image, and manages them as macros in a format in correspondence with associated information (to be described later) related to the edited images. The series of editing commands as a macro will be referred to as a "command string" hereinbelow. The editing commands include commands for generation, cutting-out, copying, pasting, deletion, movement of an image object in a document file, coloring and color adjustment of object, attribute value settings related to object processing and the like. The image to be the object of editing is, e.g., electronically captured by the scanner 18 (to be described later) or read from the external storage device 17. The respective command string data are held in local areas of the command string registerer 14.

The associated information generator 15 is a function module which generates "associated information" to cause the user to imagine the contents of a user-input event, i.e., a command string executed on an image as the object of editing, and manages the information in correspondence with the command string. The respective associated information data are stored in the local areas of the associated information generator 15.

The associated information here may be identification information such as serial numbers allotted to edited images or thumbnails (reduced RGB image data) of the edited images. The thumbnails may be any of image information before editing based on command string or image information after the editing. Otherwise, thumbnails of images obtained by merging the pre-editing images and post-editing images may be employed. Further, the associated information may include additional information on the date of generation of image, the original size, the print size, whether form is necessary or unnecessary and the like.

Upon later image editing operation, the associated information is presented to the user in the form of buttons (to be described later), for example, on the display screen of the display unit 13. Although the user cannot easily memorize command strings themselves used in the past, the user can imagine the edited effects represented by the command strings comparatively easily by referring to the associated information. Further, the user can check a command string applicable to a currently-edited image by visual observation based on the display of the associated information. Further, the user can easily execute the command string by manipulation on the button (the click of the mouse or the like).

The screen information generator 16 is a function module which has display image information to be displayed on the display screen of the display unit 13. Further, the screen information generator 16 generates screen image information of a currently-edited image, and generates a preview image prior to print output or the like.

The external storage device 17 is a device for storing edited image information in a file format (e.g., in a bitmap format having an extension ".bmp"). For example, a re-writable and nonvolatile media drive having a comparatively-large capacity such as a hard disk drive (HDD) or a magneto-optical (MO) drive is equivalent to the external storage device 17.

The scanner 18 optically scans an image on the surface of original and electronically captures the image data. The scanner 18 includes a platen on which the original is placed and an automatic document feeder (both not shown). Further, the scanner interface 19 is an input/output device for connecting the scanner 18 to the image editing apparatus 10.

The scanner 18 optically reads the original image in accordance with a scan command issued from the controller 11. The input image data at the scanner 18 is, e.g., RGB format data, and the image data may be pasted in a predetermined document file in accordance with a style and/or size designated by the scan command. For example, an image input unit within a copier (not shown) may be utilized as the scanner 18.

Note that the above-described image editing apparatus 10 may be a specialized hardware apparatus designed for original image editing. Otherwise, the image editing apparatus 10 may be a general-purpose computer system which executes a predetermined application program for image editing such as DTP. The general-purpose computer system is, e.g., a work station or a personal computer. To construct the image editing apparatus 10, many other hardware elements are required, however, to simplify the explanation and avoid complicity in the drawings, these elements are omitted from FIG. 1. For example, the image editing apparatus 10 may have an image output device such as a printer.

Next, an image-editing processing procedure realized on the image editing apparatus 10 will be described.

Figure 2:
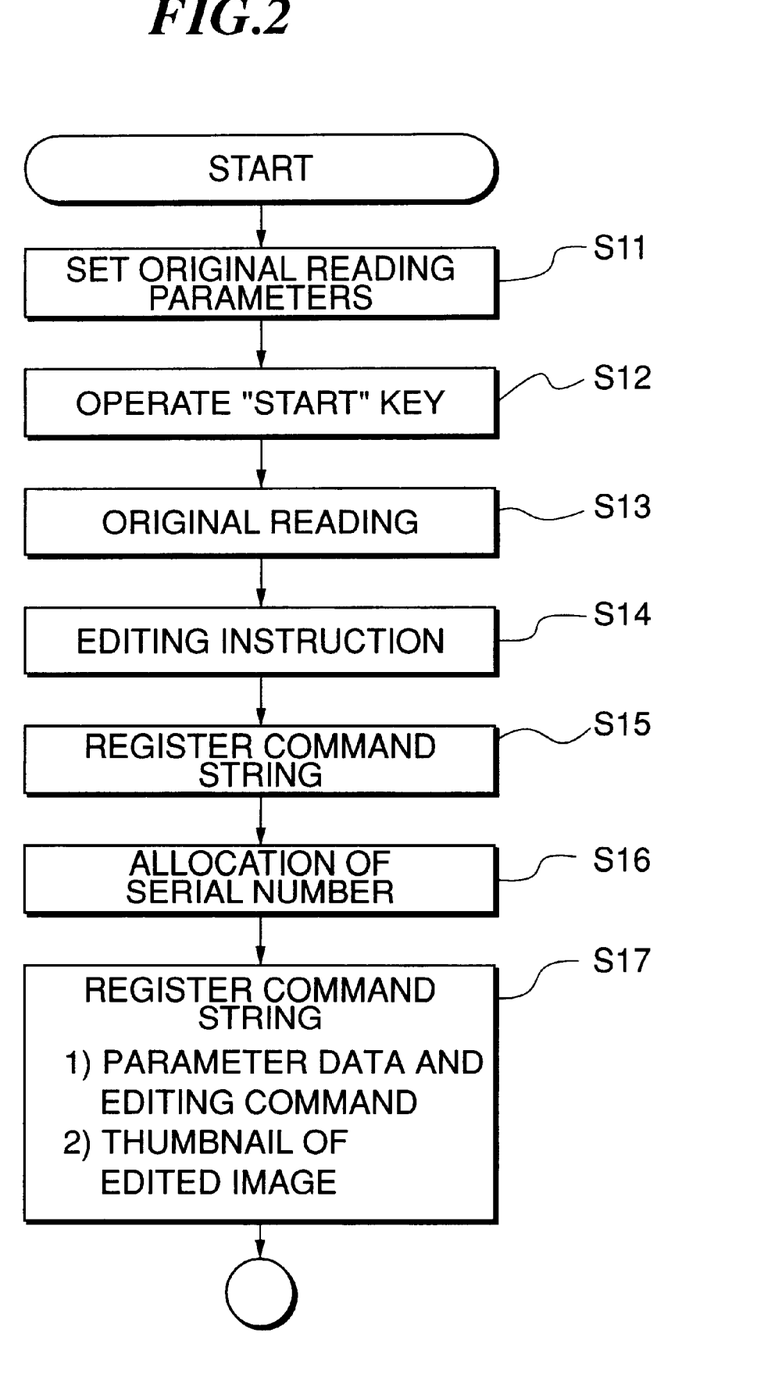
FIG. 2 is a flowchart schematically illustrating a processing procedure in image editing.

FIG. 2 schematically shows the processing procedure in image editing in the form of flowchart. The image editing processing is performed interactively on a GUI image displayed on the display unit 13. Note that the image editing processing as shown in FIG. 2 is performed on the assumption that an input image captured by the scanner 18 is edited and processed. Hereinbelow, the respective steps of the flowchart will be described.

Figure 3:
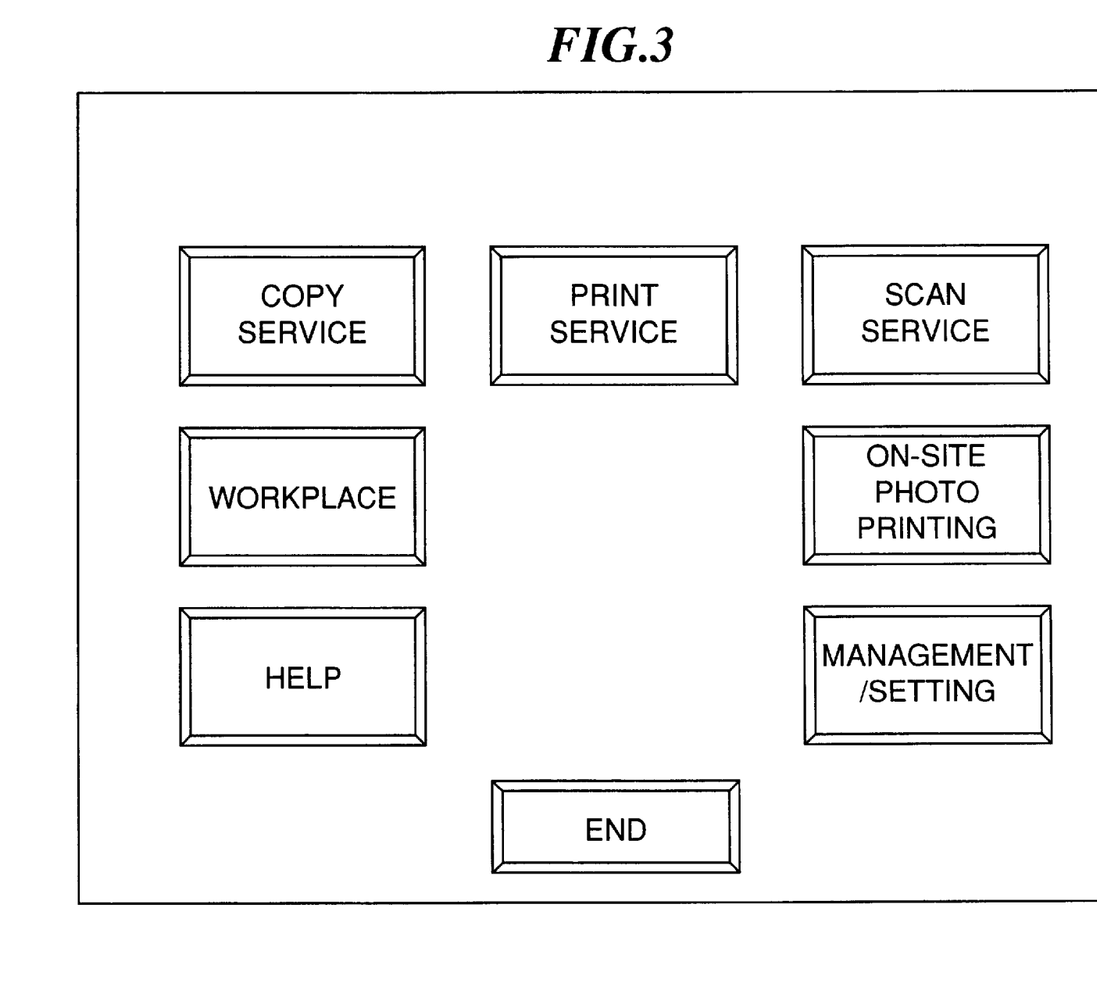
FIG. 3 illustrates a main menu provided in a display screen of a display unit 13.

On the display screen of the display unit 13, a main menu as shown in FIG. 3 is presented. On the main menu image, menu buttons to call the respective image processing functions such as "Copy Service", "Print Service" and "Scan Service" are provided. As the display on the display unit 13 supports the GUI environment, the user can select a function at the click of a desired new button with a mouse cursor or finger touch on a touch panel. In this example, in response to the selection of the "Scan Service" button corresponding to optical reading on an original image, the process routine as shown in FIG. 2 starts.

Figure 4:
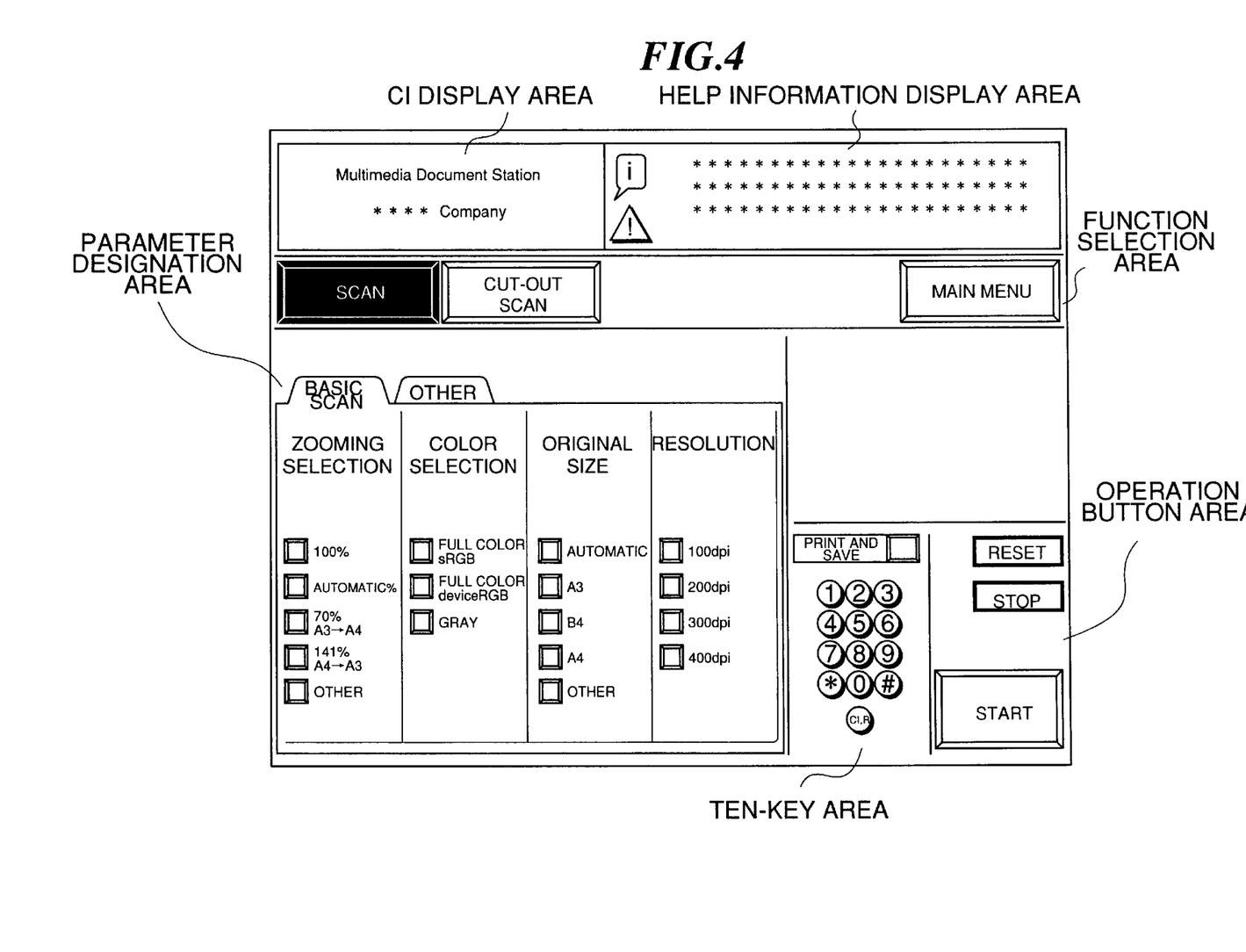
FIG. 4 schematically illustrates a scan start screen where "Scan" function is selected.

In response to the selection of the "Scan Service" button, a scan start image as shown in FIG. 4 appears on the display screen. As shown in FIG. 4, the copy start image has a "CI (Corporate Identity) display area" to display information on a product and its manufacturer, a "function selection area" where the functions supported by the image editing apparatus 10 are provided as buttons, a "help information display area" to display operation hints and error messages, an "operation button area" where buttons to control scan operation such as a start button and a stop button are provided, a "ten-key area" for numerical input, and a "parameter designation area" for designation of scan parameters. In FIG. 4, "Scan" is selected in the scan start image.

The user interactively inputs original reading parameters in the parameter designation area in FIG. 4 (step S11). The scan parameters include parameters for designation of the resolution of input image, zooming, color mode selection, an original size, the read surface of original and the like.

Next, in response to the click or touch of the "Start" button provided in an approximately lower right position in the scan start image in FIG. 4 (step S12), the image on the surface of the original placed on the platen (not shown) is optically read by the scanner 18 (step S13).

Next, editing is performed on the read image (step S14). The image editing here includes pasting, cutting out, copying, deletion and movement of input image into a document file, coloring and color adjustment of image, and other attribute settings regarding image object modification.

As a GUI environment is provided on the display screen of the display unit 13, an editing instruction is performed on the document file by a user-input event, i.e., the user's click or touch of a desired drawing object (e.g., an editing command represented as a button).

Figure 5:
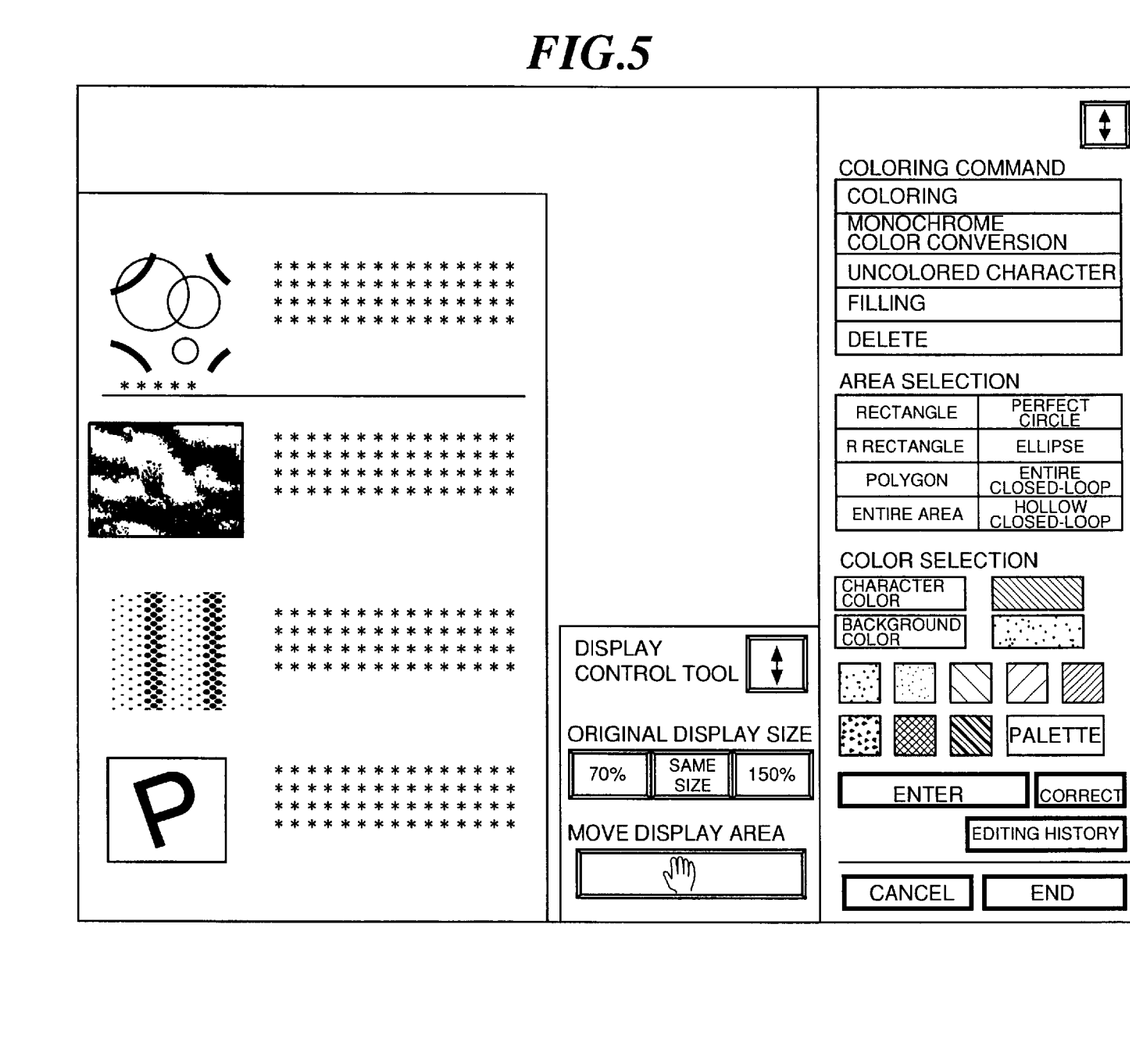
FIG. 5 schematically illustrates an image editing screen for editing a scanned image.

In the present embodiment, editing operation with respect to an image or the input of editing command is made on an image editing image as shown in FIG. 5. The image editing image has a tool window and an editing area.

In the tool window, plural groups of tool buttons for selection of image editing function, i.e., the user's command input, are provided. In the example in FIG. 5, the tool window has a "Coloring Command" group having tool buttons related to object coloring, "Coloring", "Monochrome Color Conversion", "Uncolored Character", "Filling" and "Deletion", an "Area Selection" group having tool buttons for designation of the area of an object, "Rectangle", "R Rectangle", "Polygon", "Entire Area", "Perfect Circle", "Ellipse", "Entire Closed Loop" and "Hollow Closed Loop", and a color selection palette group for designation of character color and background color. Further, "Delete" and "End" buttons in the lowest position of the tool window are respectively used for cancellation of editing content (i.e., an input command) for the displayed document and instruction of the end of editing operation.

In the present embodiment, the history of editing commands inputted and executed at step S14 is time-sequentially stored in the command string registerer 14 (described above). If an "Editing History" button provided in an approximately lower position of the tool window is clicked or touched, an "Editing History" window, where the editing commands inputted in the past are displayed in list form in the time-sequential order, is pop-up displayed.

Figure 6:
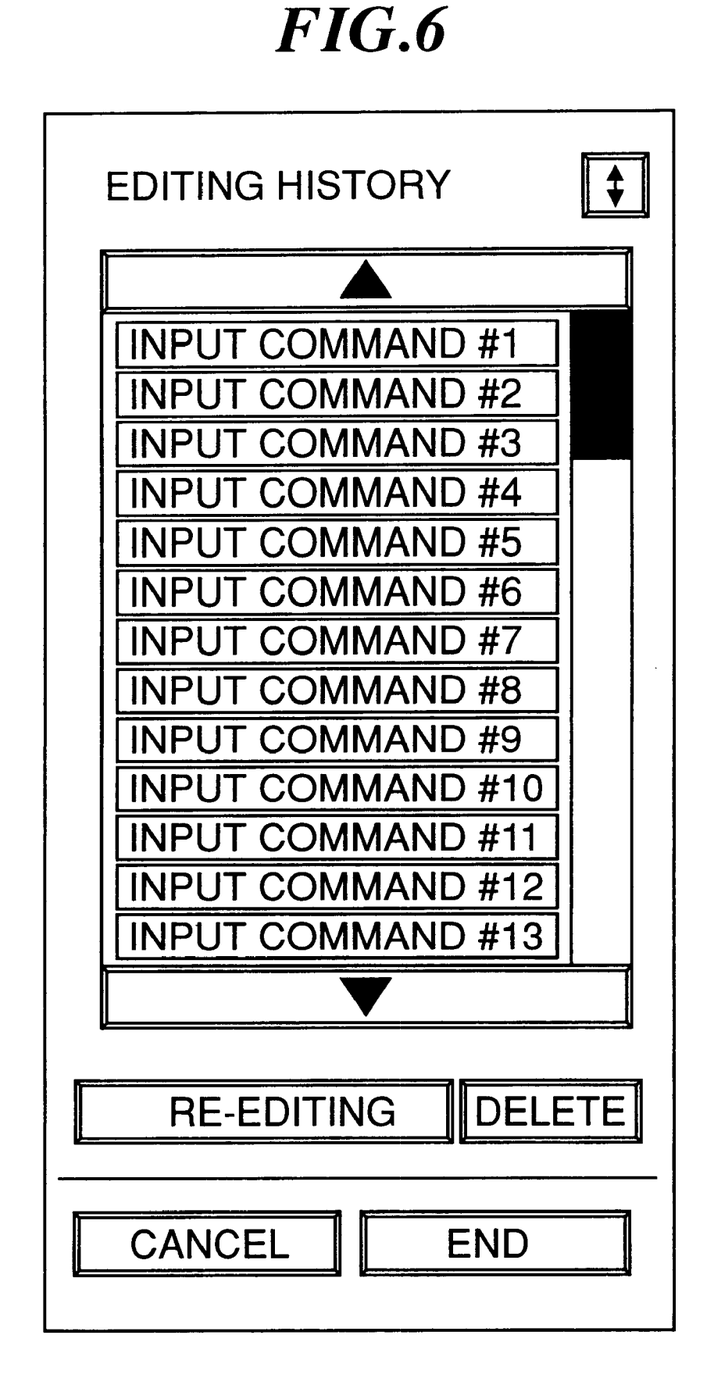
FIG. 6 schematically illustrates an editing history window.

FIG. 6 schematically illustrates the editing history window. As shown in FIG. 6, the respective editing commands inputted in the past are arranged, as buttons, in the time-sequential order. If all the editing command buttons cannot be displayed in the editing history window, they can be displayed by using the "vertical scroll bar" (shown) well-known in the field of computer technologies.

In the editing history window, in response to the click or touch of a desired editing command button, an operation image (not shown) including a window to change the attribute value of the image object to which the corresponding editing command is applied and the editing command (e.g., if a coloring command is selected, a coloring palette) appears. Then, by using the operation image, the content of the editing command can be changed (e.g., if the coloring command is selected, the color being used is changed, or if a movement command is selected, a moved position is changed), or the image is re-edited, or the command itself can be deleted.

If a "Cancel" button in the lowest position of the editing history window is clicked or touched, the content of re-editing performed on the editing history window can be canceled. Further, if an "End" button is clicked or touched, the editing history window is closed.

On the other hand, in the editing area in FIG. 5, the currently-edited document file is window-displayed. The display within the document window is sequentially updated in accordance with the result of editing command input by using the tool window (or image re-editing by using the editing history window). Further, in the editing area, a "Display Control Tool" window to input control information related to the display format of the document window is provided. In the "Display Control Tool" window, a cursor button (represented as a bidirectional arrow icon) to move a document window frame, "70%", "Same Size" and "150%" buttons for designation of original display size, and a movement button (represented as a "hand" icon) to move the document display area are provided.

Returning to FIG. 2, the image editing process routine will be described.

When the series of editing operations on the input image from the scanner 18 has been completed, it is determined at step S15 whether or not the series of editing commands used for the image as the object of editing are to be registered as a "command string". The determination may be made by pop-up displaying a dialog box on the display screen asking the user's decision as to whether or not the editing commands are to be registered as a command string. If it is determined that the editing commands are to be registered as a command string, a serial number is allotted to the command string at step S16. The value of the serial number is used as a piece of associated information at the subsequent image editing process. The serial number may be automatically allotted, or it may be user programmable.

When the command string is registered, the command string registerer 14 stores the series of editing commands used for the input image at step S14, as a macro "command string", with the scan parameters set at step S11. Further, the associated information generator 15 generates "associated information" to cause the user to imagine the editing contents of the command string performed on the image as the object of editing at step S14. The generated associated information is stored in correspondence with the corresponding command string.

The associated information may be the serial number allotted at step S16 or reduced RGB image data of the edited image, i.e., thumbnails. The thumbnails may be any of RGB images before editing based on command string or RGB images after the editing. Otherwise, the thumbnails may be images obtained by merging the pre-editing images and post-editing images. Further, the associated information may include additional information on the date of generation of image, the original size, the printing size, and whether form is necessary or unnecessary.

Next, a processing procedure in image editing by executing a registered command string will be described.

Figure 7:
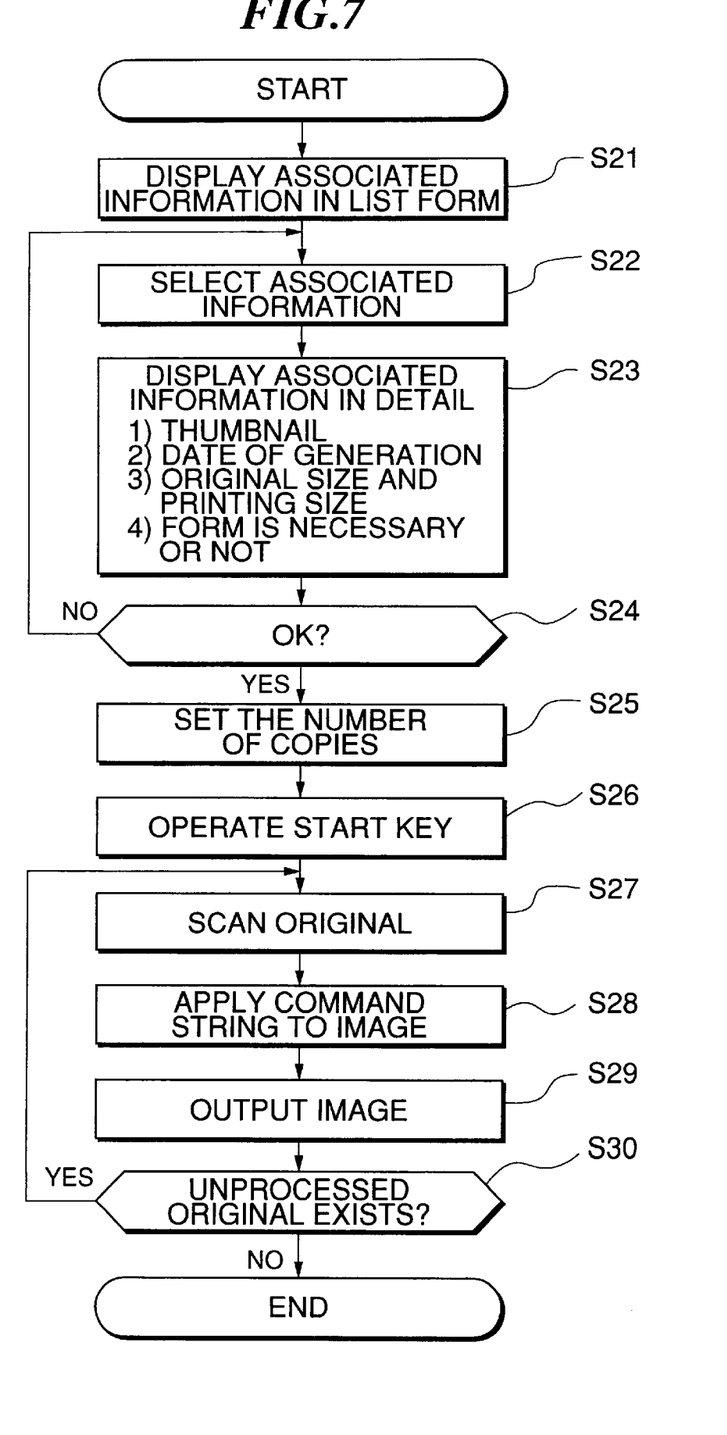
FIG. 7 is a flowchart showing a processing procedure to execute a command string, particularly in a case where command strings are sequentially applied to respective images continuously read by a scanner 18.

FIG. 7 schematically shows the processing procedure in image editing in the form of flowchart. The application of command string is interactively performed in a GUI image displayed on the display unit 13. Note that the processing as shown in FIG. 7 is performed in a case where plural pages of original images are continuously scanned by the scanner 18, command strings are applied to the respective read images, and the images are outputted by printing or the like. Hereinbelow, the respective steps of the flowchart will be described.

On the display screen of the display unit 13, the main menu (described above) as shown in FIG. 3 is presented. In response to the selection of the "Copy Service" button corresponding to the optical reading operation on original image, a copy processing routine as shown in FIG. 7 starts.

Figure 8:
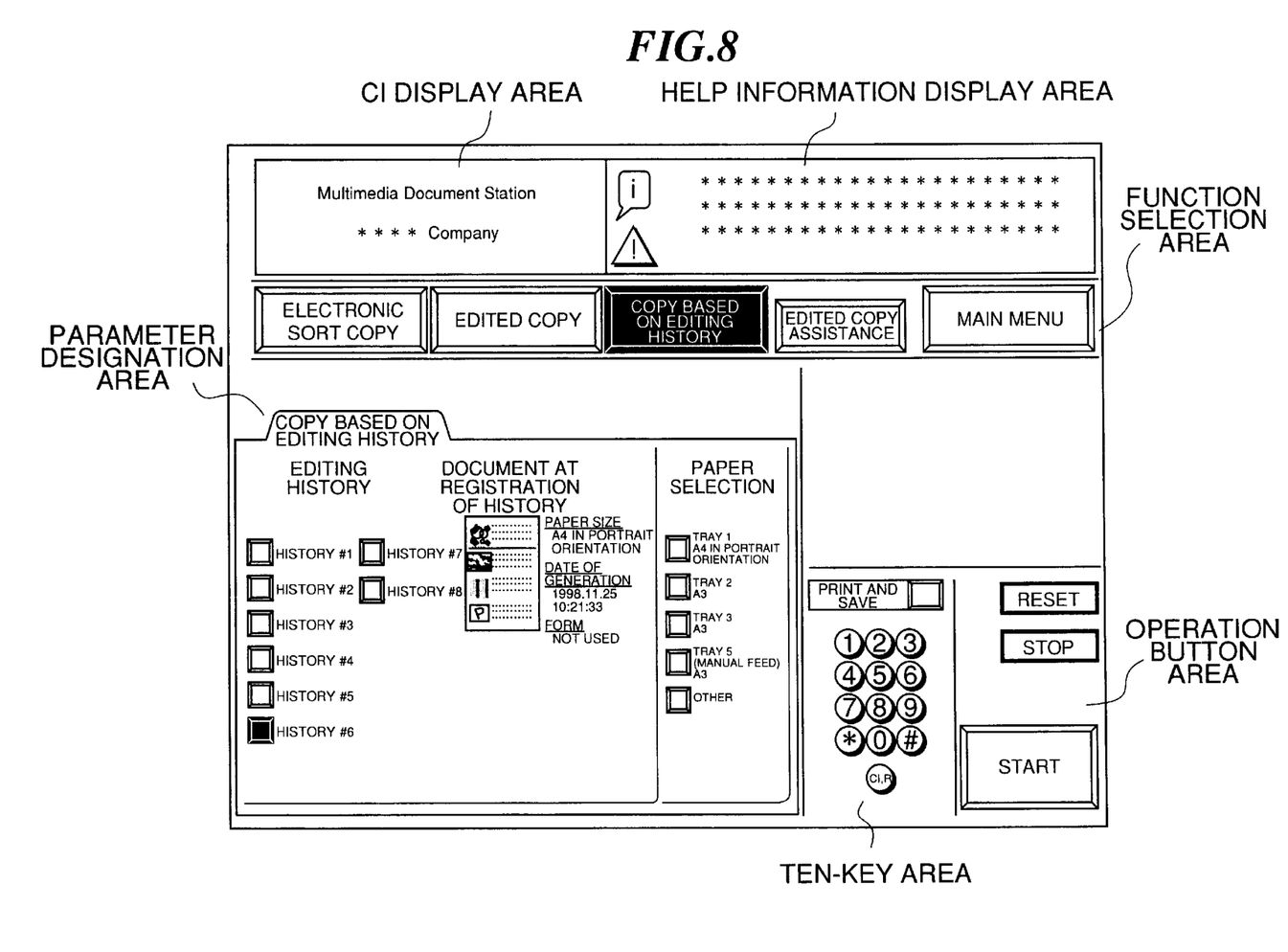
FIG. 8 schematically illustrates a copy start screen for copy operation on an edited image, where a "Copy Based on Editing History" function is selected.

In response to the selection of the "Copy Service" button, a copy start image as shown in FIG. 8 appears on the display screen. As in the case of the scan start image as shown in FIG. 4, the copy start image has a "CI (Corporate Identity) display area" to display information on a product and its manufacturer, a "function selection area" where the functions supported by the image editing apparatus 10 are provided as buttons, a "help information display area" to display operation hints and error messages, an "operation button area" where buttons to control scan operation such as a start button and a stop button are provided, a "ten-key area" for numerical input, and a "parameter designation area" for designation of scan parameters.

In the copy start image as shown in FIG. 8, a "Copy Based on Editing History" function is selected. The copy based on editing history here means performing image editing by application of past editing history to images sequentially read from the scanner, and printing images as results of the editing. The editing history is a command string registered in the command string registerer 14.

In the parameter designation area of the copy start image upon selection of the copy based on editing history, the associated information of registered command strings, are displayed, as buttons, in list form as shown in FIG. 8 (step S21). In this example, as the associated information, the serial number allotted at step S16 (See FIG. 2) is used. For example, a "History #1" button is equivalent to an editing history or command string with serial number #1.

The user can designate a desired command string by the click or touch of a button with a serial number on the parameter designation area (step S22).

Then, in response to the button manipulation, other associated information related to the command string such as reduced RGB image data of an image edited based on the command string, i.e., thumbnail, the date of generation of the image, the original size, the printing size, and where form is necessary or unnecessary, is displayed as information related to a "document at registration of history" (step S23). In the example in FIG. 8, a "History #6" button is selected, and in response to the selection, a thumbnail of an edited image corresponding to the editing history and additional information on the paper size and the like are displayed in the "document at registration of history" area in a right position to the buttons. Although the user cannot easily memorize command strings themselves used in the past editing, the user can imagine the editing contents represented by the command strings accurately to some extent and comparatively easily by referring to the associated information. Further, as the associated information of command strings used in the past are displayed in list form, a large number of command strings can be selectively used easily.

Next, at determination step S24, the user determines whether or not a currently-selected command string is applicable to the current edited image. The result of determination is interactively inputted via the GUI image (not shown). According to the present embodiment, the user can check the command string by visual observation based on the display of the associated information. If the result of determination is negative, the process returns to step S22 at which command-string button selection is performed again. If the result of determination is affirmative, the process proceeds to the subsequent step.

Prior to the start of copying operation, the user can set the number of copies to be printed (step S25). Then, the copying operation starts (step S26) by the click or touch of a "Start" button provided in an approximately lower right position of the copy start image (See FIG. 8).

That is, the scanner 18 scans the surface of original placed on the platen (not shown) and inputs an image (step S27). If the scanner 18 has an automatic document feeder (ADF: not shown), scanning and image input operation are performed continuously on plural original pages.

The input images of the respective original pages are sequentially transferred, and the controller 11 sequentially applies command strings designated at step S24 to these images (step S28).

As described above, the command string is an array of editing commands inputted for an image in the sequential order. According to the present invention, a command string to be applied is quickly and easily designated by the button operation at step S22 (described above). Further, various editing commands such as commands for coloring, movement and copying of image are provided for respective images. According to the present invention, plural editing commands are handled as a macro, and the editing operation can be repeatedly applied to a subsequent edited image simply by calling the macro.

Next, the edited image to which the command string has been applied is image-outputted (step S29). The image output generally means duplication of the edited image on a print sheet by using a printer (not shown). Note that the present invention is not limited to this print output, but includes storage as an image file in, e.g., the external storage device 17. Otherwise, the image data may be transferred to another computer system remotely connected via a network (not shown).

Then, at determination step S30, it is determined whether or not an unprocessed original exists. If an unprocessed original exists, the process returns to step S27, at which the above-described original scanning, application of command string and image-output processing operation are repeatedly performed. If image output for all the originals has been completed, the processing flow ends.

Note that in the parameter designation area of the copy start image in FIG. 8, the associated information using serial numbers are displayed in list form, however, another piece of associated information may be used in the list form display.

Figure 9:
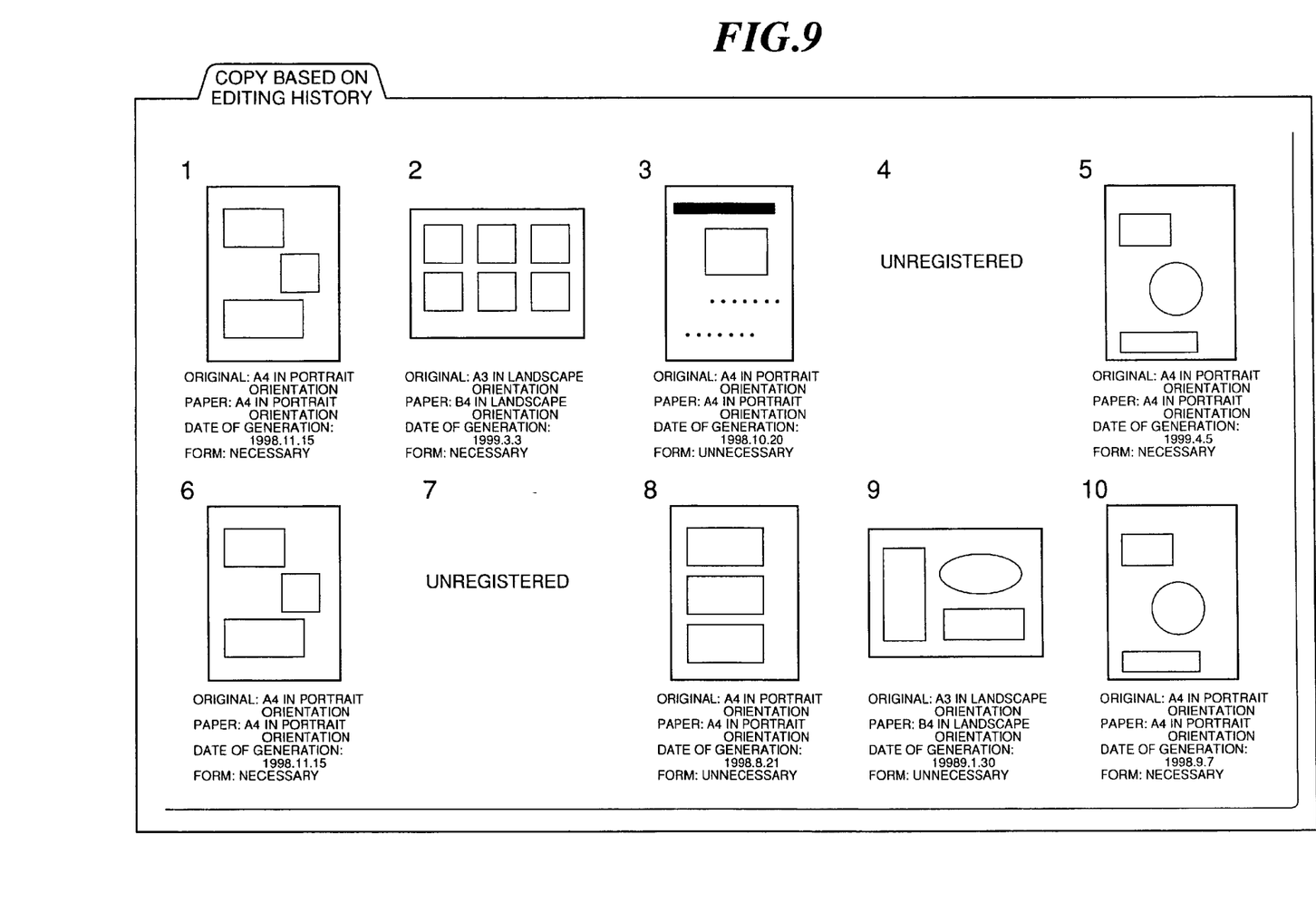
FIG. 9 schematically illustrates a parameter designation area using thumbnails of edited images, as another display example of the copy start screen.

FIG. 9 schematically illustrates the parameter designation area using thumbnails of edited images as the associated information. As shown in FIG. 9, thumbnails of edited images associated with the registered command strings are displayed as buttons in list form. If other associated information on the date of generation of image, the original size, the printing size, and whether form is necessary or not, and the like is added to the respective thumbnails, the user can imagine the contents of the command strings more accurately. Further, as the associated information of the command strings are displayed in list form, the user can selectively use a large number of command strings easily.

Figure 10:
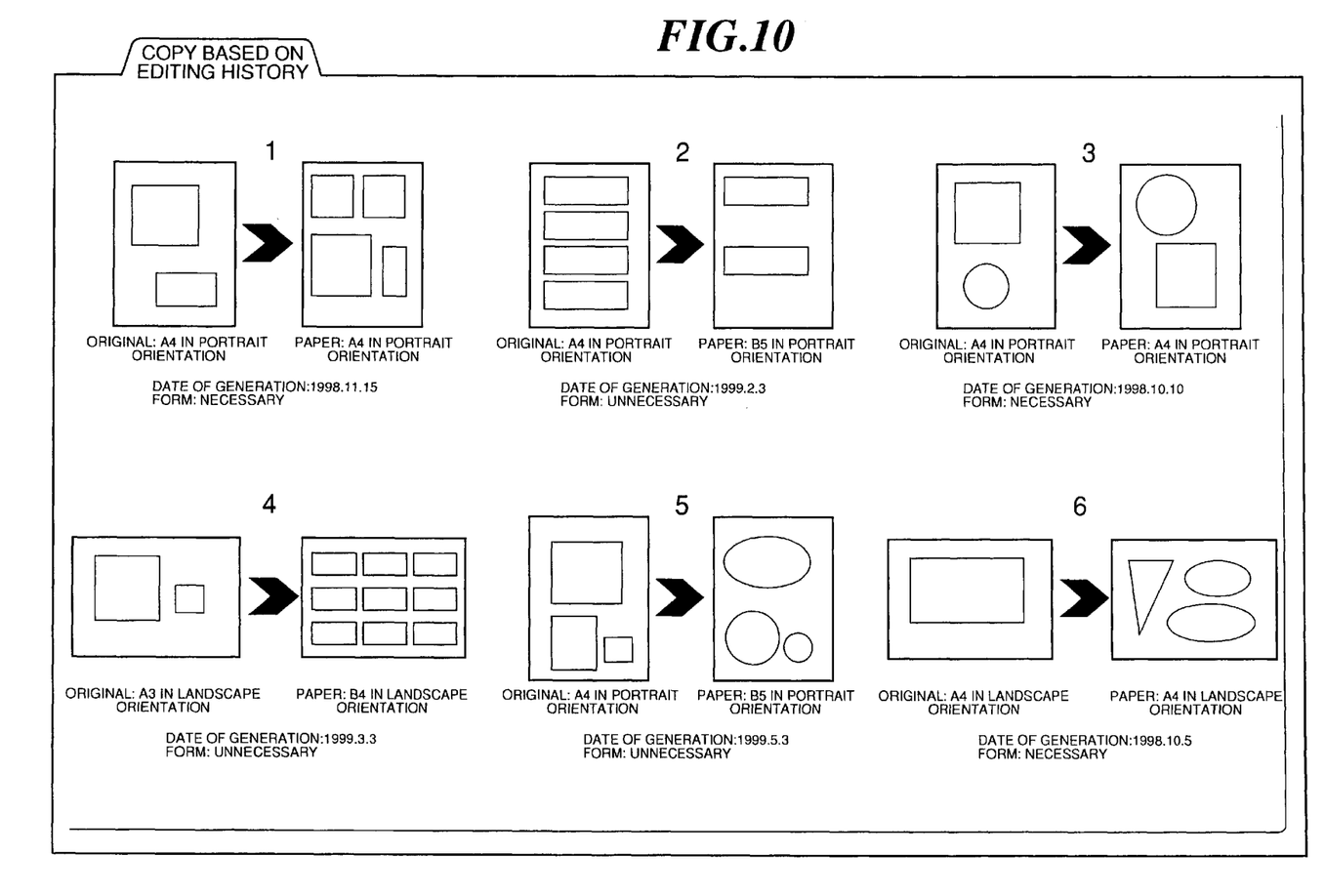
FIG. 10 schematically illustrates the parameter designation area using the thumbnails obtained by merging pre-editing images and post-editing images as associated information, as another display example of the copy start image.

FIG. 10 schematically illustrates the parameter designation area using the thumbnails, obtained by merging images before editing based on command string and images after the editing, as associated information. As shown in FIG. 10, merge thumbnails associated with the respective registered command strings are displayed, as buttons, in list form. The user can grasp the edited effects of the respective command strings more accurately by checking the pre-editing and post-editing images by visual observation. If other associated information on the date of generation of image, the original size, the printing size, and whether form is necessary or unnecessary and the like is added to the respective thumbnails, the user can check the command strings more accurately. Further, as the associated information of the command strings are displayed in list form, the user can selectively use a large number of command strings easily.

Note that in the example as shown in FIG. 10, the associated information generator 15 must generate thumbnails in advance by merging pre-editing and post-editing images and store the thumbnails at step S17 (See FIG. 2).

The present invention has been described in detail with reference to the particular embodiment. However, it is obvious that those skilled in the art can make modifications and alternatives to the embodiment without departing from the subject matter of the present invention.

For example, in the processing procedure as shown in FIGS. 2 and 7, the image as the object of editing is inputted via the scanner 18, however, the image input is not limited to the input via the scanner 18. Even in a case where an image stored in the external storage device 17 is read and edited, the same advantages of the present invention can be attained.

As described above, the present invention provides excellent image editing method and apparatus capable of editing an image with high operability in accordance with an instruction input (command) from a user.

Further, the present invention provides excellent image editing method and apparatus capable of performing editing operations simply and efficiently by utilizing the history of past editing, i.e., a command string.

Further, the present invention provides excellent image editing method and apparatus capable of performing editing operations simply and efficiently by displaying associated information of command strings in list form for the user to selectively use a large number of command strings with ease.

According to the present invention, as command strings used in the past image editing are handled as macros, the operability is improved. Further, as macro command strings are displayed by identification numbers or thumbnails of edited images, the user can discriminate a desired command string easily and accurately. Further, upon implementation of the present invention, any specific hardware is required, and excessive lord is not applied to the user.

In some document file generation, a series of editing operations performed in the past is to be applied to plural image information sequentially input via e.g. a scanner, with almost no change (or only by changing values). According to the present invention, a command string of editing operations performed in the past is handled as a macro for each edited image, and displayed as a button by using associated information such as a thumbnail of the edited image. That is, the user can repeatedly use the editing history by simple operation of button selection. Thus, the usability can be greatly improved.

What is claimed is:

1. An image editing method for editing an image in accordance with a user-input event, comprising:
   (a) storing a series of user-input events, caused during a predetermined image-editing period, as a macro;
   (b) generating associated information related to editing contents realized by the macro;
   (c) repeating steps (a)–(b) to form a plurality of macros;
   (d) displaying associated information corresponding to the respective macros in a list form, the associated information including at least one of (1) a thumbnail of an image obtained by merging pre-editing images and post-editing images, and (2) a composite thumbnail that contains the edited image merged with textual information illustrating aspects of the corresponding command string; and
   (e) in response to selection of the displayed associated information, applying a macro corresponding to the selected associated information to a currently-edited image.

2. An image editing apparatus for editing an image in accordance with a user-input event, comprising:
   (a) input means for accepting a user-input event;
   (b) edited-image generation means for generating an edited image in accordance with the user-input event inputted via the input means;
   (c) display means for displaying the edited image on a display screen;
   (d) event storage means for storing series of user-input events, caused during a predetermined image editing period as macros;
   (e) associated-information generation means for generating associated information related to editing contents realized by each said macro, the associated information including at least one of (1) a thumbnail of an image obtained by merging pre-editing images and post-editing images, and (2) a composite thumbnail that contains the edited image merged with textual information illustrating aspects of the corresponding macro;
   (f) associated-information display means for displaying associated information corresponding to the respective macros in a list form; and
   (g) macro application means for, in response to selection of the displayed associated information, applying a macro corresponding to the selected associated information to a currently-edited image.

3. An image editing method for editing an image by using plural editing commands, comprising:
   (a) sequentially storing a series of editing commands designated by a user during a period of editing one image;
   (b) generating associated information related to the image edited based on the series of editing commands;
   (c) registering the series of editing commands as a command string, in correspondence with the associated information;
   (d) repeating steps (a)–(c) for multiple image editing operations to form plural past editing command strings;
   (e) displaying the associated information corresponding to already-registered command strings in a list form, the associated information including at least a thumbnail of an image obtained by merging pre-editing images and post-editing images; and
   (f) in response to selection of the displayed associated information, applying a command string corresponding to the selected associated information to a currently-edited image.

4. An image editing apparatus for editing an image by using plural editing commands, comprising:
   (a) input means for inputting an editing command;
   (b) edited-image generation means for generating an edited image in accordance with the command inputted via the input means;

(c) display means for displaying the edited image on a display screen;

(d) input-command storage means for sequentially storing a series of editing commands designed for a user during a period of editing one image;

(e) associated-information generation means for generating associated information related to the image edited based on the series of editing commands;

(f) command-string registration means for registering series of editing commands as command strings, in correspondence with the associated information;

(g) associated-information display means for displaying the associated information corresponding to already-registered command strings in a list form, the associated information including at least a thumbnail of an image obtained by merging pre-editing images and post-editing images; and (h) command-string application means for, in response to selection of the displayed associated information, applying a command string corresponding to the selected associated information to a currently-edited image.

5. An image editing method for editing an image by using plural editing commands, comprising:

(a) sequentially storing a series of editing commands designated by a user during a period of editing one image;

(b) generating associated information related to the image edited based on the series of editing commands;

(c) registering the series of editing commands as a command string, in correspondence with the associated information;

(d) repeating steps (a)–(c) for multiple image editing operations to form plural past editing command strings;

(e) displaying the associated information corresponding to already-registered command strings in a list form, the associated information including at least a composite thumbnail that contains the edited image merged with textual information illustrating aspects of the corresponding command string; and (f) in response to selection of the displayed associated information, applying a command string corresponding to the selected associated information to a currently-edited image.

6. An image editing apparatus for editing an image by using plural editing commands, comprising:

(a) input means for inputting an editing command;

(b) edited-image generation means for generating an edited image in accordance with the command inputted via the input means;

(c) display means for displaying the edited image on a display screen;

(d) input-command storage means for sequentially storing a series of editing commands designed for a user during a period of editing one image;

(e) associated-information generation means for generating associated information related to the image edited based on the series of editing commands;

(f) command-string registration means for registering series of editing commands as command strings, in correspondence with the associated information;

(g) associated-information display means for displaying the associated information corresponding to already-registered command strings in a list form, the associated information including at least a composite thumbnail that contains the edited image merged with textual information illustrating aspects of the corresponding command string; and (h) command-string application means for, in response to selection of the displayed associated information, applying a command string corresponding to the selected associated information to a currently-edited image.

* * * * *